(12) United States Patent
Nishino et al.

(10) Patent No.: US 7,330,419 B2
(45) Date of Patent: Feb. 12, 2008

(54) OPTICAL HEAD DEVICE AND OPTICAL INFORMATION APPARATUS USING THE SAME

(75) Inventors: Seiji Nishino, Osaka (JP); Hidenori Wada, Uji (JP); Yoshiaki Komma, Hirakata (JP); Sadao Mizuno, Ibaraki (JP); Keiichi Matsuzaki, Ikeda (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/443,751

(22) Filed: May 31, 2006

(65) Prior Publication Data

US 2006/0215505 A1 Sep. 28, 2006

Related U.S. Application Data

(62) Division of application No. 10/264,297, filed on Oct. 2, 2002, now Pat. No. 7,110,342.

(30) Foreign Application Priority Data

| Oct. 2, 2001 | (JP) | ............................. 2001-306119 |
| Aug. 27, 2002 | (JP) | ............................. 2002-247747 |
| Sep. 19, 2002 | (JP) | ............................. 2002-274085 |

(51) Int. Cl.
*G11B 7/00* (2006.01)

(52) U.S. Cl. ............................. 369/112.08; 369/112.24

(58) Field of Classification Search ..................... None
See application file for complete search history.

(56) References Cited

U.S. PATENT DOCUMENTS

| 5,644,413 A | 7/1997 | Komma et al. |
| 5,717,674 A | 2/1998 | Mori et al. |
| 5,734,502 A | 3/1998 | Ebstein |
| 5,734,637 A | 3/1998 | Ootaki et al. |
| 5,754,512 A | 5/1998 | Komma et al. |
| 5,969,862 A | 10/1999 | Maruyama |
| 6,014,360 A | 1/2000 | Yonekubo et al. |
| 6,134,055 A | 10/2000 | Koiki |
| 6,388,822 B1 | 5/2002 | Kitamura et al. |

FOREIGN PATENT DOCUMENTS

| EP | 0 610 055 | 8/1994 |
| EP | 0 789 355 | 8/1997 |
| EP | 0 836 178 | 4/1998 |
| EP | 1 120 779 | 8/2001 |
| JP | 7-262594 | 10/1995 |
| JP | 2001-6204 | 1/2001 |
| JP | 2001-060336 | 3/2001 |

*Primary Examiner*—Paul W. Huber
(74) *Attorney, Agent, or Firm*—Hamre, Schumann, Mueller & Larson, P.C.

(57) ABSTRACT

An optical head device includes a focusing optical system for focusing a laser beam emitted from a semiconductor laser light source on an optical information medium with an objective lens. A chromatic aberration correction element for correcting chromatic aberration occurring in the objective lens is provided between the semiconductor laser light source and the optical information medium. A light distribution correction element in which the transmittance increases with the distance from the center of the aperture surface of the objective lens is provided so as to correct a reduction of the intensity of the light incident on the aperture surface of the objective lens with the distance from the center of the aperture surface.

13 Claims, 14 Drawing Sheets

OPTICAL HEAD DEVICE AND OPTICAL INFORMATION APPARATUS USING THE SAME

CROSS REFERENCE TO RELATED APPLICATIONS

This application is a Division of application Ser. No. 10/264,297, filed Oct. 2, 2002 now U.S. Pat. No 7,110,342, which application is incorporated herein by reference.

BACKGROUND OF THE INVENTION

1. Field of the Invention

The present invention relates to an optical head device for use in recording information on an optical information medium and reproducing information recorded on the optical information medium, an optical information apparatus (including recording/reproducing apparatuses and read-only apparatuses) using the same and a system in which they are used.

2. Description of the Related Art

In recent years, in-depth research has been conducted to achieve higher density for optical disk systems by increasing the numerical aperture (NA) of an objective lens to decrease the diameter of a focus spot on an optical disk. For example, the NA of an objective lens of a CD system is 0.4, and the NA of an objective lens of a DVD system is 0.6, whereas the NA of an objective lens of a next generation disk system will be as large as 0.85. In this case, the in-plane distribution of the light incident on the aperture of the objective lens is an issue.

This can be explained as follows. If the in-plane distribution of the light incident on the aperture of the objective lens is constant, the diameter of a focus spot that is focused on an optical disk by the objective lens is represented by $\lambda/NA$, where $\lambda$ is a wavelength of a light source. In addition, the relationship of $NA=r/f$ is satisfied, where r is the aperture radius of the objective lens, and f is the focal distance of the objective lens.

The aperture radius r and the focal distance f are generally determined by the physical size of the objective lens, but it is easily inferred that, for example, the effective aperture radius when the light amount is 0 at the periphery of the aperture is smaller than the physical aperture radius of the objective lens. Therefore, even if efforts are made to achieve higher density of optical disk systems by increasing the NA of the objective lens, that is, even if efforts are made to decrease the diameter of the focus spot on the optical disk, higher density cannot be achieved without the in-plane distribution of the light incident on the aperture of the objective lens being as uniform as possible.

The non-uniform in-plane distribution of the light incident on the aperture of the objective lens conventionally has been a problem. This is caused by the fact that the light intensity of the laser beam emitted from a semiconductor laser light source is not uniform in the light flux.

This problem will be described with reference to FIGS. 16 and 17. FIG. 16 is a view showing the relationship between a laser beam emitted from a semiconductor laser light source and the amount of light captured by a collimator lens, and FIG. 17 is a diagram showing light intensity distribution with respect to an angle at which a laser beam emitted from the semiconductor laser light source diverges (hereinafter, referred to as "diverging angle"). As seen from FIG. 17, the light intensity of a laser beam emitted from the semiconductor laser light source 10 decreases in the manner of a Gaussian function as the light flux radius from the center of the collimator lens 9 increases. Therefore, in prior art, in order to make the intensity distribution in the collimated light flux 8 entering the aperture radius of the objective lens as uniform as possible, the radius rc and the focal distance fc of the collimator lens 9 are adjusted (i.e., the relationship: the capturing NA of the collimator lens 9=rc/fc is adjusted). Thus, only the laser beam within the angle θd of the laser beam emitted from the semiconductor laser light source 10 is captured by the aperture of the objective lens.

Naturally, the smaller the capturing NA of the collimator lens 9 is, the less the intensity distribution in the collimated light flux 8 is, but the utilization efficiency of the laser beam emitted from the semiconductor laser light source is reduced. Therefore, the capturing NA of the collimator lens 9 is determined in view of the balance between the intensity distribution in the collimated light flux 8 and the utilization efficiency of the laser beam. In general, this value is set to about 0.2. As described above, in the next generation optical disk systems, the numerical aperture NA of the objective lens is as large as 0.85 to achieve a higher density than that of DVD systems, and a semiconductor laser light source in a wavelength of 405 nm is used.

On the other hand, for glass material for lens production, as the wavelength of a light source becomes shorter, a change in refractive index with respect to a change in wavelength becomes larger. In general, a change in refractive index of the glass material used for a lens when a wavelength of a light source is changed 1 nm in the vicinity of 405 nm is about three to four times larger than that at a wavelength in the vicinity of 650 nm for DVD reproduction.

When the temperature of a semiconductor laser light source having a wavelength of 405 nm is changed, the emission wavelength is varied, so that the refractive index of an objective lens is changed. Thus, the refractive index of the objective lens is displaced from the refractive index at the time of design, so that the shift amount of the focus spot from the surface of the optical disk by the objective lens is about three to four times larger than that for DVD (chromatic aberration of the objective lens). Furthermore, the lens refracts beams more strongly in a portion closer to the perimeter, so that the beams that pass through the portion closer to the perimeter of the objective lens are affected more by the change in the refractive index. Therefore, a larger focus shift due to the chromatic aberration of the objective lens occurs for the beams that pass through the portion closer to the perimeter of the objective lens, and substantially no focus shift occurs for paraxial beams.

On the other hand, when the NA of the objective lens is increased for higher density, the depth of focus is reduced in inverse proportion to the square of the NA. Therefore, the depth of focus of a system having an NA of 0.85 is only ½ of the focus depth of a system having an NA of 0.6.

Therefore, the focus shift due to chromatic aberration in a next generation disk system (NA of 0.85, a wavelength of a light source of 405 nm) is eight times more demanding than that of a DVD system. Therefore, in the next generation optical disk system, it is necessary to pay attention to the shift of the focus position due to a variation of the wavelength of the light source. When it takes 10 msec or more for the focus position to shift, the focus shift is detected by a focus error detection method, and the objective lens is moved accordingly so as to cancel this focus shift. Therefore, the shift of the focus position due to variations in the wavelength of the light source is not a problem. However, when it takes 10 msec or less for the focus position to shift, for example, the focus is displaced at the time of switching of recording/reproduction of the semiconductor laser light source, which results in poor recording/reproduction and causes a large problem.

As shown in FIG. 18, in order to reduce the chromatic aberration, the objective lens 1 includes three lenses 1c, 1f and 1e that form two groups. The lens 1c is a convex lens and the lens 1f is a concave lens, so that when the emission wavelength of the semiconductor laser light source is shorter than a central wavelength of 405 nm, the refractive index of the glass material constituting the convex lens is slightly increased. Therefore, the convex lenses 2b, 1c and 1e refract beams strongly, so that a focus spot 4 that is focused on a signal surface of an optical disk 3 is shifted to the side of the lens 1e. On the other hand, when the emission wavelength of the semiconductor laser light source is longer than a central wavelength of 405 nm, the refractive index of the glass material constituting the convex lens is decreased. Therefore, the refraction of beams by the convex lenses 2b, 1c and 1e becomes weak, so that the focus spot 4 that is focused on a signal surface of the optical disk 3 is shifted to the side opposite to the lens 1e.

On the other hand, concave lenses 2a and if act on the beams in the opposite manner to the convex lenses 2b, 1c and 1e. Therefore, when the emission wavelength of the semiconductor laser light source is varied, a change of the beams by the convex lenses 2b, 1c and 1e is cancelled by the change by the concave lenses 2a and if, so that the shift of the focus spot 4 can be suppressed. The shift amount of the focus spot 4 due to variations of the emission wavelength of this semiconductor laser light source is larger as the curvature of the spherical surface of the lens is larger. Therefore, the shift of the focus spot 4 by the convex lenses 2b, 1c and 1e is mostly cancelled by the concave lens if that has a large curvature. Thus, when the objective lens 1 is constituted by three lenses 1c, if and 1e forming two groups in this manner, even if the emission wavelength of the semiconductor laser light source is changed 1 nm from 405 nm, the shift amount of the focus spot 4 from the signal surface of the optical disk 3 can be restricted to be about 0.001 µm. However, in the case of this lens arrangement, two more lenses are required than when a single lens is used as the objective lens 1 for CD systems and DVD systems, so that an adjusting process becomes complicated. Furthermore, when the objective lens 1 is constituted by a single lens as shown in FIG. 17, simplification of an assembly process and a reduction of the number of lenses reduce costs. However, the shift amount of the focus spot 4 due to the chromatic aberration is as much as 0.5 µm. Therefore, it is necessary to add some element to reduce the chromatic aberration in this case.

In the optical head device shown in FIG. 20, an objective lens 1 constituted by two lenses is used to reduce costs. In this arrangement, not only are the costs reduced, but also the chromatic aberration can be reduced more than in the case of the objective lens 1 constituted by a single lens. Nevertheless, the shift amount of the focus spot 4 due to the chromatic aberration is about 0.35 µm, and it is necessary to add some element to reduce the chromatic aberration in this case as well.

When the objective lens 1 as shown in FIGS. 19 and 20 is used, a chromatic aberration correction element 7 constituted by a diffraction grating is inserted in order to reduce the chromatic aberration that occurs at the time of a variation of the emission wavelength of a semiconductor laser light source. In this case, compared to the objective lens 1 having three lenses in two groups shown in FIG. 18, one or two lenses are eliminated and the chromatic aberration correction element 7 is added. However, since this chromatic aberration correction element 7 can be formed in a simple manner by utilizing one surface of the convex lens 2b constituting a beam expander 2 when the convex lens 2b is formed with resin, the costs can be reduced significantly, compared to the case where the objective lens 1 having three lenses in two groups shown in FIG. 18 is used.

This approach of reducing the chromatic aberration has been well-known for a long time (e.g., JP 2001-60336A, which is referred to as "first conventional example"), but when the amount of the chromatic aberration of the objective lens 1 increases, the grating pitch of the chromatic aberration correction element 7 decreases.

This chromatic aberration correction element 7 can reduce the chromatic aberration for the following reasons. As described above, for example, when the emission wavelength of the semiconductor leaser light source is shorter than a central wavelength of 405 nm, the refractive index of the glass material constituting the convex lens increases and the power of the convex lens increases. Therefore, beams are refracted strongly and the focal distance becomes shorter. On the other hand, the relationship between the wavelength λ and the angle of diffraction θh at the diffraction grating constituting the chromatic aberration correction element 7 is θh=λ/p, where p is the grating pitch of the diffraction grating, and therefore when the wavelength becomes shorter, the angle of diffraction becomes smaller. Therefore, the chromatic aberration correction element 7 acts on beams in the opposite manner to the convex lens. Thus, it is possible to cancel the focus shift caused by the objective lens 1 due to wavelength variation by inserting such a chromatic aberration correction element 7. In this case, since the dependence of the diffraction angle on the wavelength is utilized, the larger the amount of chromatic aberration to be corrected is, the larger the angle of diffraction θh with respect to the wavelength variation has to be. Therefore, when the chromatic aberration of the objective lens 1 becomes larger, the grating pitch of the chromatic aberration correction element 7 becomes narrower, and the grating pitch of the chromatic aberration correction element 7 becomes rougher in a portion closer to the paraxial at the inner circumference.

As described above, the shift amount of the focus spot 4 due to the chromatic aberration in the case where the objective lens 1 having two lenses is about 0.35 µm, and the grating pitch of the collimator lens 9 to cancel this chromatic aberration is about 6 µm at the outermost portion of the effective diameter, and about 150 µm at the central portion. Thus, when the grating pitch is changed significantly, the diffraction efficiency in each radius position of the chromatic aberration correction element 7 is changed as shown by the solid line in FIG. 2A. Therefore, beams in the vicinity of the center of the objective lens 1 are achromatized by the diffraction grating having a pitch of 150 µm, and therefore the diffraction efficiency in this portion is 99%. On the other hand, beams in the outermost portion of the effective diameter of the objective lens 1 are achromatized by the diffraction grating having a pitch of 6.5 µm, and therefore the diffraction efficiency in this portion is about 92% (the diffraction efficiency with respect to the pitch is a value as a result of taking an estimated reduction amount due to processing error that can occur in practical use into account, based on the theoretical value).

Next, as a second conventional example, an arrangement disclosed in JP7-262594A will be described with reference to FIG. 21. In FIG. 21, reference numeral 41 denotes an optical disk, and reference numeral 42 denotes a semiconductor laser light source. Reference numeral 43 denotes a hologram that splits diffracted light 431 in a direction oblique to the optical axis of the incident beam in such a manner that the diffracted light does not enter other optical elements. The laser beam that is emitted from the semiconductor laser light source 42 and enters the hologram 43 is diffracted so as to be converted to light beams having a constant light intensity in the vicinity of the center and passes through the hologram 43 (zero-order diffraction). The upper surface of the grating constituting the surface of the hologram forms a smooth curve. Reference numeral 45 denotes an objective lens for focusing the light beam having a constant light intensity in the vicinity of the center that has passed through the hologram 43 on the optical disk 41 to form a focus spot. Since the light beams are made to have a constant light intensity in the vicinity of the center by the diffraction of the hologram 43, the light beams are focused by the objective lens 45 such that the diameter of the focus spot formed on the optical disk 41 can be a small spot in which the $1/e^2$ width is substantially equal to $0.96\lambda/NA$.

In the chromatic aberration correction element 7 for correcting the chromatic aberration occurring in the objective lens 1, the grating pitch becomes smaller toward the perimeter, and the diffraction efficiency is reduced toward the perimeter. Therefore, the light intensity in the vicinity of the perimeter of the objective lens 1 is reduced significantly, corresponding to a reduction in the manner of a Gaussian function of the intensity of the semiconductor laser light source with respect to the radius distance of the light flux.

When the light intensity in the vicinity of the perimeter of the objective lens is reduced significantly, the effective NA of the objective lens is reduced. As a result, light cannot be focused sufficiently on the optical disk, and the recording density on the optical disk cannot be increased in proportion to the NA.

Furthermore, in the second conventional example, the angle of diffraction should be large so that the diffracted light 431 is split in a direction oblique to the optical axis of the incident beam in such a manner that the diffracted light does not enter other optical elements. As a result, the grating pitch of the hologram 43 is as small as 2 µm, or less, and this is difficult to produce. In addition, the light intensity in the vicinity of the center is constant. Furthermore, the light beams 421 emitted from the semiconductor laser light source 42 constitute a so-called Gaussian distribution in which the intensity in the center is strongest, and the light amount decreases gradually as approaching the perimeter. Therefore, the diffraction efficiency of the hologram 43 should be highest in the center, that is, the zero-order transmittance should be low, and the diffraction efficiency should become lower gradually, that is, the zero-order transmittance should become higher, as approaching the perimeter. Thus, the diffraction efficiency of the hologram 43 is changed depending on the portion, so that if there is a displacement with the center of the light intensity of the light beams 421, the light amount distribution of zero-order transmitted light is changed significantly, which makes it difficult to form a small focus spot as desired on the optical disk.

SUMMARY OF THE INVENTION

Therefore, with the foregoing in mind, it is an object of the present invention to provide an optical head device having a large numerical aperture (NA) of an objective lens and a small diameter of a focus spot on an optical disk that can achieve high density of an optical disk system and provide a high light utilization efficiency, and an optical information apparatus using the same, and a system in which they are used.

A first configuration of an optical head device of the present invention includes a focusing optical system for focusing a laser beam emitted from a semiconductor laser light source on an optical information medium with an objective lens. A chromatic aberration correction element for correcting chromatic aberration occurring in the objective lens is provided between the semiconductor laser light source and the optical information medium, and a light distribution correction element in which a transmittance increases with a distance from a center of the aperture surface of the objective lens is provided so as to correct a reduction of the intensity of the light incident on the aperture surface of the objective lens with a distance from the center of the aperture surface.

It is preferable in the first configuration of the optical head device of the present invention that the light distribution correction element is a concentric diffraction grating having a phase step.

In this case, it is preferable that the chromatic aberration correction element and the light distribution correction element are formed on respective surfaces of one lens.

A second configuration of an optical head device of the present invention includes a focusing optical system for focusing a laser beam emitted from a semiconductor laser light source on an optical information medium with an objective lens. A light distribution correction element in which a transmittance in a vicinity of a center of an aperture surface of the objective lens is reduced by a certain amount is provided between the semiconductor laser light source and the optical information medium so as to correct a reduction of the intensity of the light incident on the aperture surface of the objective lens with a distance from the center of the aperture surface.

It is preferable in the second configuration of the optical head device of the present invention that a portion of the light distribution correction element in which the transmittance is reduced is formed with a metal vapor deposited film.

It is preferable in the second configuration of the optical head device of the present invention that a portion of the light distribution correction element in which the transmittance is reduced is formed with a hologram.

It is preferable in the second configuration of the optical head device of the present invention that a portion of the light distribution correction element in which the transmittance is reduced is formed with a dielectric multilayer film.

It is preferable in the second configuration of the optical head device of the present invention that the transmittance in the portion of the light distribution correction element in which the transmittance is reduced is in the range of 65% to 85%.

It is preferable in the second configuration of the optical head device of the present invention that a chromatic aberration correction element for correcting chromatic aberration occurring in the objective lens further is provided between the semiconductor laser light source and the optical information medium, and the transmittance in the portion of the light distribution correction element in which the transmittance is reduced is in the range of 60% to 75%.

It is preferable in the first or second configuration of the optical head device of the present invention that the optical head device further includes a photo-detector for detecting light reflected at the optical information medium; and optical path splitting means for splitting the light reflected at the optical information medium from the direction of the semiconductor laser light source to guide the light to the photo-detector, and the light distribution correction element is disposed between the semiconductor laser light source and the optical path splitting means.

A third configuration of an optical head device of the present invention includes a focusing optical system for focusing a laser beam emitted from a semiconductor laser light source on an optical information medium with an objective lens. A light distribution correction element in which a reflectance in a vicinity of a center of an aperture surface of the objective lens is reduced by a certain amount is provided between the semiconductor laser light source and the optical information medium so as to correct a reduction of the intensity of the light incident on the aperture surface of the objective lens with a distance from the center of the aperture surface.

It is preferable in the third configuration of the optical head device of the present invention that a portion of the light distribution correction element in which the reflectance is reduced is formed with a dielectric multilayer film.

It is preferable in the third configuration of the optical head device of the present invention that the reflectance in the portion of the light distribution correction element in which the reflectance is reduced is in the range of 65% to 85%.

It is preferable in the third configuration of the optical head device of the present invention that a chromatic aberration correction element for correcting chromatic aberration occurring in the objective lens further is provided between the semiconductor laser light source and the optical information medium, and the reflectance in the portion of the light distribution correction element in which the reflectance is reduced is in the range of 60% to 75%.

It is preferable in the third configuration of the optical head device of the present invention that the optical head device further includes a photo-detector for detecting light reflected at the optical information medium; and optical path splitting means for splitting the light reflected at the optical information medium from the direction of the semiconductor laser light source to guide the light to the photo-detector, and the light distribution correction element is disposed between the optical path splitting means and the optical information medium.

A fourth configuration of an optical head device of the present invention includes a focusing optical system for focusing a laser beam emitted from a semiconductor laser light source on an optical information medium with an objective lens. A chromatic aberration correction element constituted by a relief type blaze grating for correcting chromatic aberration occurring in the objective lens is provided between the semiconductor laser light source and the optical information medium. The height of the blaze grating in a portion corresponding to the vicinity of the center of an aperture surface of the objective lens of the chromatic aberration correction element is set to a height that is different from a height in which a diffraction efficiency is largest so as to correct a reduction of the intensity of the light incident on the aperture surface of the objective lens with a distance from the center of the aperture surface.

It is preferable in the fourth configuration of the optical head device of the present invention that the chromatic aberration correction element and the objective lens are fixed integrally. In this case, it is preferable that the chromatic aberration correction element is formed integrally on a surface of the objective lens.

It is preferable in the first, second, third or fourth configuration of the optical head device of the present invention that a numerical aperture from the semiconductor laser light source to the focusing optical system is set to be larger than when light distribution is not corrected.

A fifth configuration of an optical head device of the present invention includes a focusing optical system for focusing a laser beam emitted from a semiconductor laser light source on an optical information medium with an objective lens. A light distribution correction element in which a transmittance in a vicinity of a center of an aperture surface of the objective lens is reduced by a certain amount is provided between the semiconductor laser light source and the optical information medium so as to correct a reduction of the intensity of the light incident on the aperture surface of the objective lens with a distance from the center of the aperture surface, and a power of the laser beam emitted from the semiconductor laser light source is monitored by using light in the vicinity of the center of the aperture surface of the objective lens that is lost by the light distribution correction element.

A sixth configuration of an optical head device of the present invention includes a focusing optical system for focusing a laser beam emitted from a semiconductor laser light source on an optical information medium with an objective lens. A light distribution correction element in which a reflectance in a vicinity of a center of an aperture surface of the objective lens is reduced by a certain amount is provided between the semiconductor laser light source and the optical information medium so as to correct a reduction of the intensity of the light incident on the aperture surface of the objective lens with a distance from the center of the aperture surface, and a power of the laser beam emitted from the semiconductor laser light source is monitored by using light in the vicinity of the center of the aperture surface of the objective lens that is lost by the light distribution correction element.

An optical information apparatus of the present invention includes the optical head device of the present invention, an optical information medium driving portion for driving the optical information medium, and a control portion for receiving a signal obtained from the optical head device and controlling the optical information medium driving portion and the semiconductor light source and the objective lens included in the optical head device, based on the signal.

A computer of the present invention includes the optical information apparatus of the present invention, an input apparatus from which information is input, a processing apparatus for performing processing based on the information input from the input apparatus and information read out by the optical information apparatus, and an output apparatus for displaying or outputting the information input from the input apparatus, the information read out by the optical information apparatus and results of the processing by the processing apparatus.

An optical disk player of the present invention includes the optical information apparatus of the present invention, and a converting apparatus from information to images for converting an information signal obtained from the optical information apparatus to images.

A car navigation system of the present invention includes the optical disk player of the present invention.

An optical disk recorder of the present invention includes the optical information apparatus of the present invention, and a converting apparatus from images to information for converting image information to information to be recorded onto the optical information medium by the optical information apparatus.

An optical disk server of the present invention includes the optical information apparatus of the present invention, and an input/output terminal for exchanging information with an external device.

The present invention provides an optical head device that can increase the density of an optical disk system by increasing the numerical aperture (NA) of the objective lens and reducing the diameter of a focus spot on the optical disk. In this case, the semiconductor laser power necessary for a recording/reproduction optical head can be reduced at least about 10% more than the conventional approach of reducing the capturing NA. That is, the light utilization efficiency can be improved.

DESCRIPTION OF THE PREFERRED EMBODIMENTS

Hereinafter, the present invention will be described more specifically by way of embodiments.

First Embodiment

Figure 1:
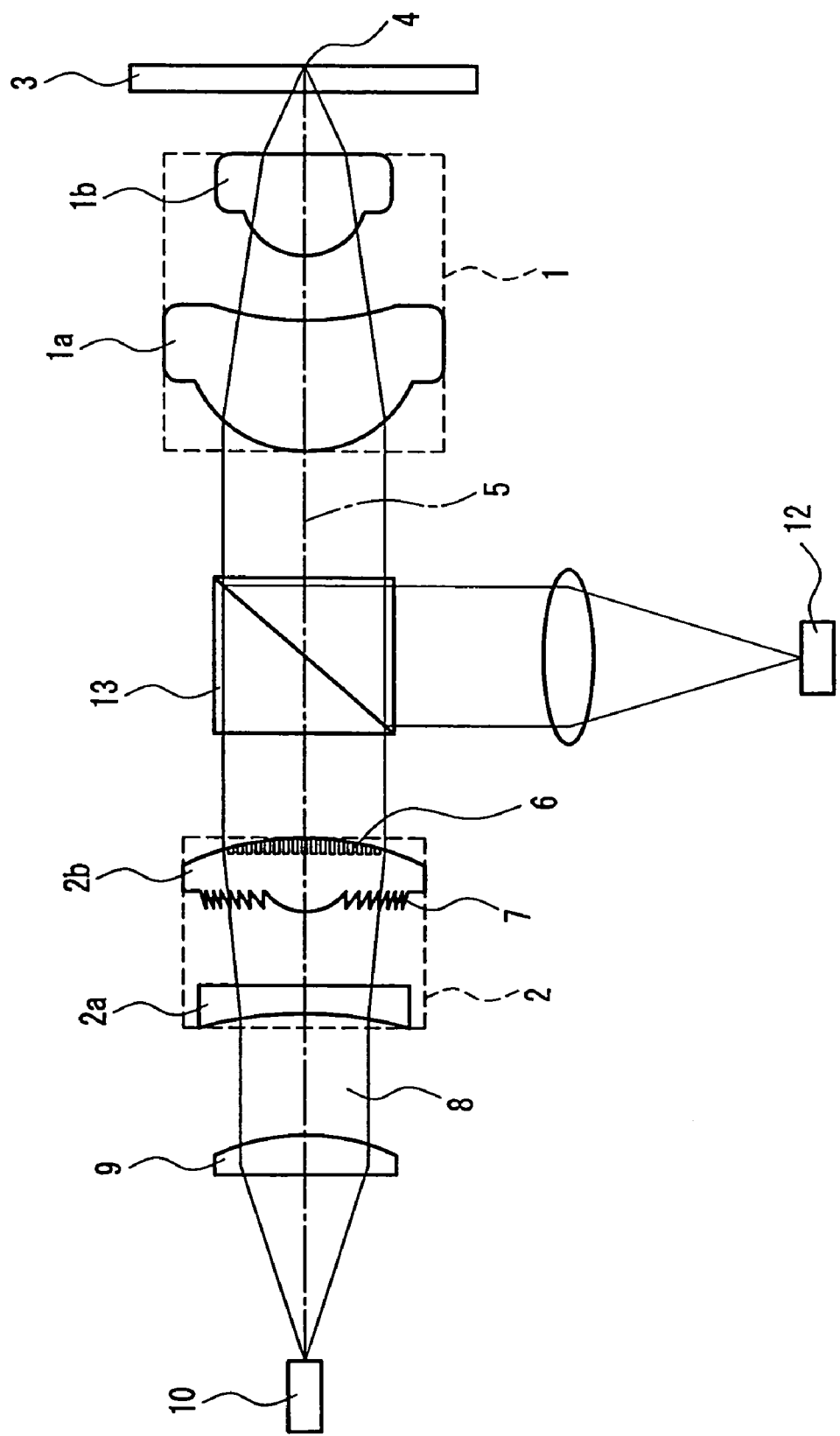
FIG. 1 is a schematic view showing the configuration of an optical head device according to a first embodiment of the present invention.

FIG. 1 is a schematic view showing the configuration of an optical head device according to a first embodiment of the present invention.

As shown in FIG. 1, the optical head device of this embodiment includes a focusing optical system that focuses a laser beam emitted from a semiconductor laser light source 10 on an optical disk (optical information medium) 3, using an objective lens 1. The objective lens 1 includes a convex lens 1a and a convex lens 1b (two lens structure) that are disposed in this order from the side of the semiconductor laser light source 10.

A beam expander 2 including a concave lens 2a and a convex lens 2b that are disposed in this order from the side of the semiconductor laser light source 10 is provided between the semiconductor laser light source 10 and the objective lens 1. The beam expander 2 is inserted in this manner for the following reason. If the numerical aperture (NA) of the objective lens 1 is increased for higher density of the optical disk system, the size of a focus spot 4 on the optical disk 3 is changed due to spherical aberration by an error in the thickness of a protective layer of the optical disk 3. Therefore, the beam expander 2 is inserted to change a distance between the concave lens 2a on the incident side and the convex lens 2b on the outgoing side so that the spherical aberration is corrected. The beam expander 2 also is inserted to match the aperture radius of the objective lens 1 to the light flux diameter of the collimated light flux 8 from a collimator lens 9.

A chromatic aberration correction element 7 constituted by a diffraction grating is formed on a surface of the convex lens 2b constituting the beam expander 2 on the side of the concave lens 2a to correct chromatic aberration occurring in the objective lens 1.

Figure 16:
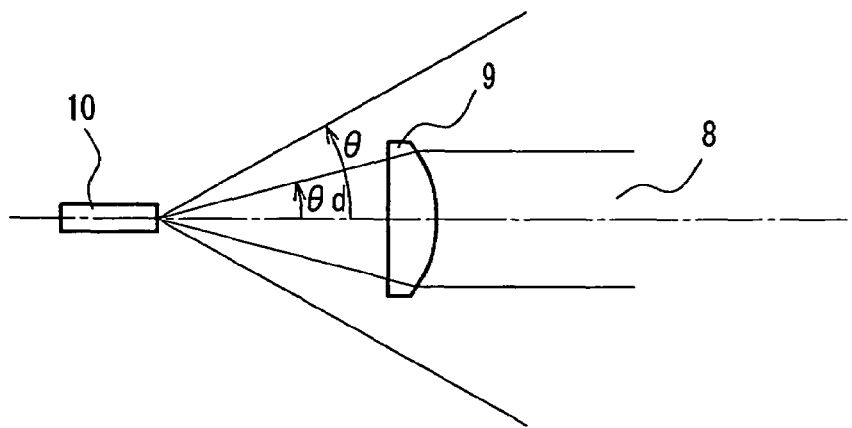
FIG. 16 is a view showing the relationship between a laser beam emitted from a semiconductor laser light source and the amount of light captured by a collimator lens.
Figure 17:
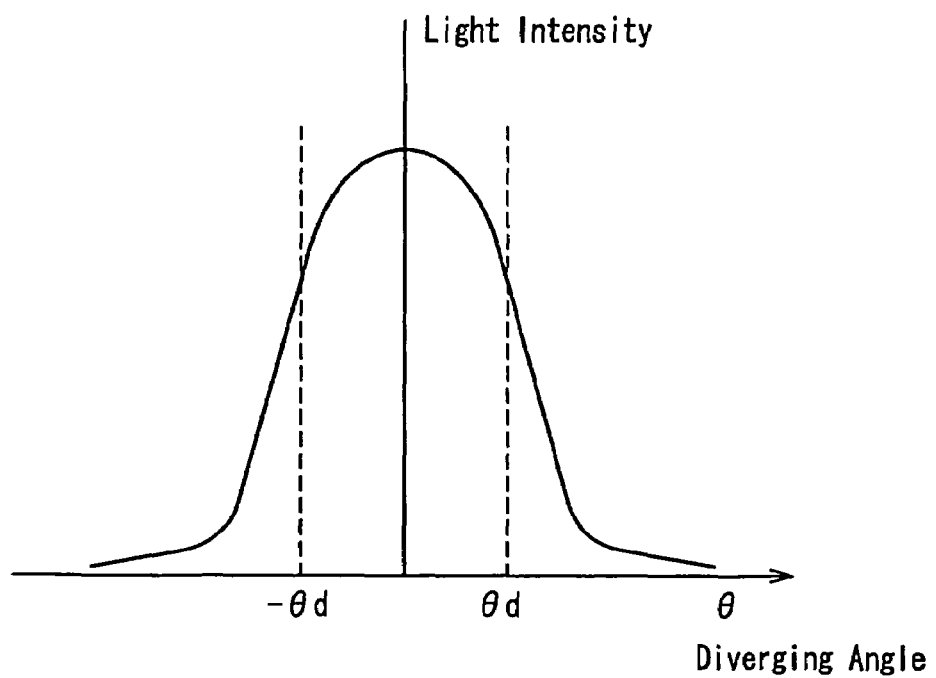
FIG. 17 is a diagram showing light intensity distribution with respect to a diverging angle.
Figure 18:
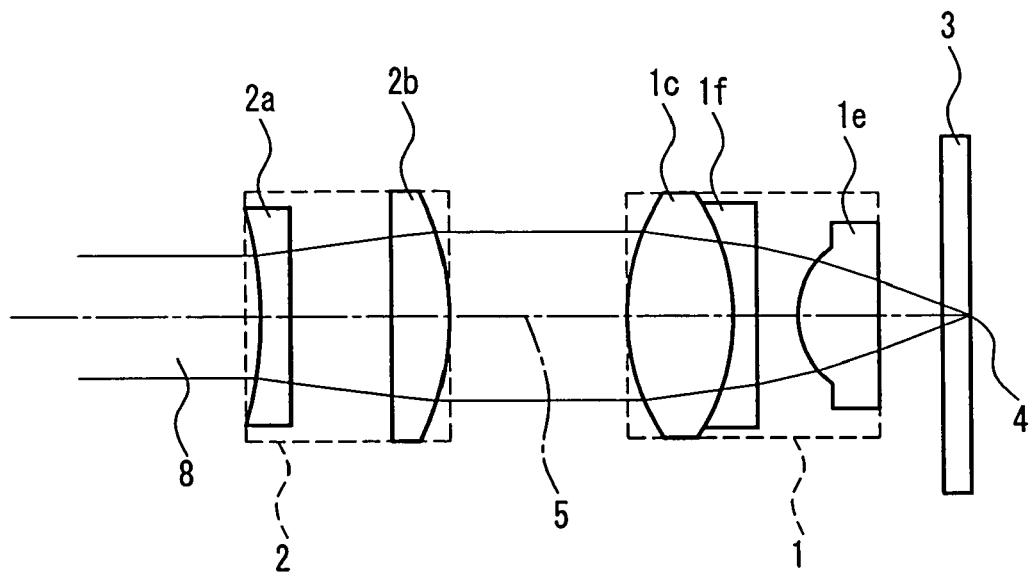
FIG. 18 is a schematic view showing an arrangement in the vicinity of an objective lens of a conventional optical head device including an objective lens having three lenses forming two groups.
Figure 19:
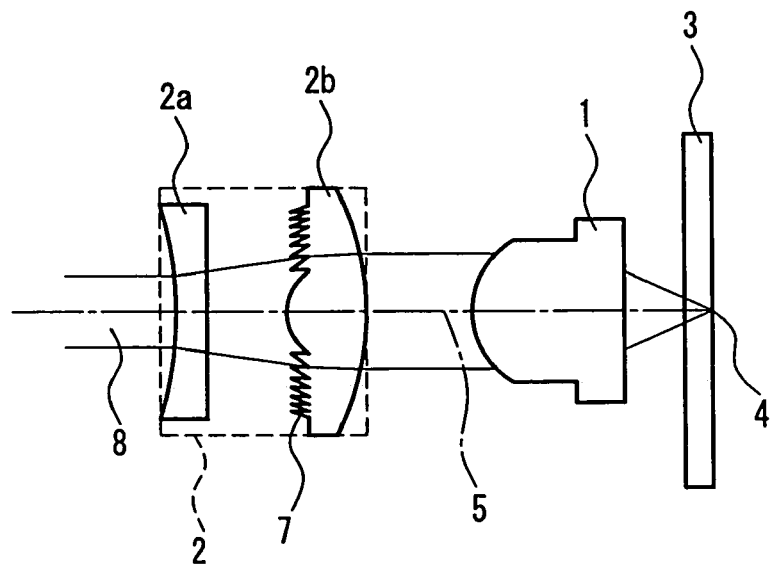
FIG. 19 is a schematic view showing an arrangement in the vicinity of an objective lens of a conventional optical head device including an objective lens having a single lens.
Figure 20:
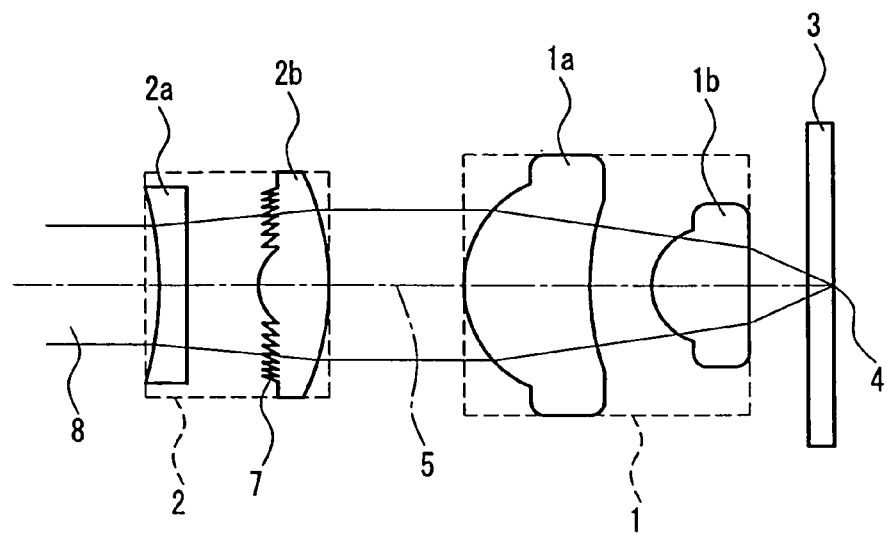
FIG. 20 is a schematic view showing an arrangement in the vicinity of an objective lens of a conventional optical head device including an objective lens having two lenses.
Figure 21:
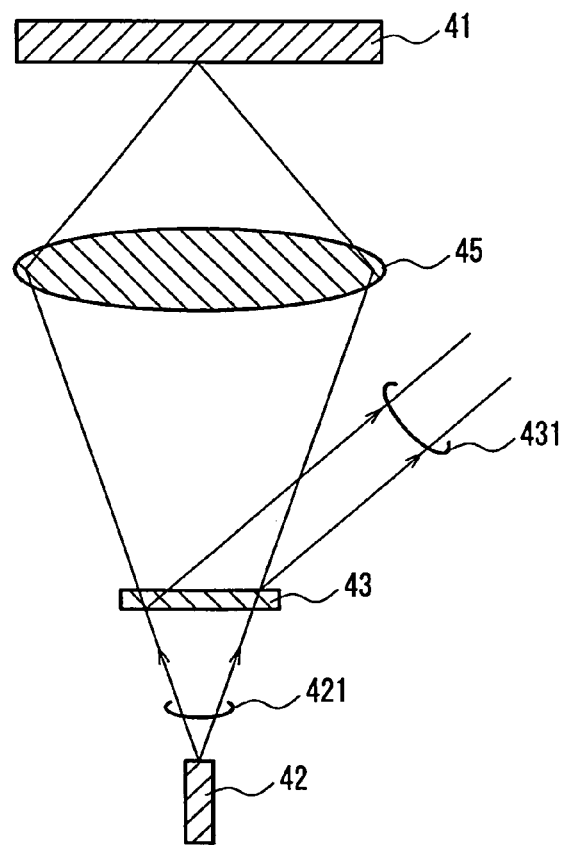
FIG. 21 is a schematic cross-sectional view showing a principal part of another example of the conventional optical head device.

Thus, in this embodiment, the chromatic aberration occurring in the objective lens 1 is corrected by the chromatic aberration correction element 7 formed in the concave lens 2a constituting the beam expander 2 so that even if laser output is changed in the semiconductor laser light source 10 for switching of recording/reproducing, the focus spot 4 on the optical disk 3 is not moved. However, as described in the section of the prior art, in the chromatic aberration correction element 7, the pitch becomes smaller toward the radial direction of the light flux, and the shortest pitch length is about 6 μm at the outermost portion of the light flux, and the diffraction efficiency is reduced to about 90%. On the other hand, divergent light (laser beam) emitted from the semiconductor laser light source 10 is converted to the collimated light flux 8 by the collimator lens 9. In this case, as shown in FIG. 16, an angle θd at which a laser beam is captured by the collimator lens 9 (hereinafter, referred to as a "capturing angle") is smaller than a diverging angle θ of the laser beam so that a reduction of the light intensity in the outermost portion of the effective diameter of the lens with respect to the light intensity on the optical axis is as small as possible. Therefore, the smaller the capturing angle θd of the laser beam is, the stronger the intensity at the rim is, but the transmittance efficiency of the laser beam in the collimator lens 9 becomes poor. This method surely makes it possible to solve the problem of a reduction of the light amount distribution due to a reduction of diffraction efficiency occurring in the outer portion, using the chromatic aberration correction element 7. However, this method causes the problem that the light amount loss is significantly large.

In this embodiment, in order to solve this problem, a light distribution correction element 6 constituted by a diffraction grating in which the transmittance is increased as the distance from the center (optical axis) on the aperture surface of the objective lens 1 is formed in the convex lens 2b constituting the beam expander 2 on the side of objective lens 1. The chromatic aberration correction element 7 has a higher diffraction efficiency in the central portion, and the diffraction efficiency decreases as approaching the peripheral portion, and thus the light amount distribution is effected. In other words, the intensity of the light incident on the aperture surface of the objective lens 1 decreases with the distance from the center of the aperture surface. In order to correct this decrease, it is necessary to form the light distribution correction element 6 in which the transmittance is low in the central portion and increases as approaching the peripheral portion. For example, a phase type diffraction grating that has a groove depth for high diffraction efficiency in the central portion and whose groove depth becomes smaller as approaching the peripheral portion may be formed as the light distribution correction element 6. Furthermore, also changing the ratio of the convex surface and the concave surface of the diffraction grating in one pitch can correct a reduction of the intensity of the light incident on the aperture surface of the objective lens 1 with the distance from the center of the aperture surface. In this case, the ratio of the convex surface and the concave surface is made larger or smaller than "1" in the peripheral portion, and this ratio is made closer to "1" toward the central portion. Thus, as the distance to the central portion is shorter, the diffraction efficiency can be higher and transmittance can be lower.

Furthermore, the allowability of the position error of the light distribution correction element 6 with respect to the optical axis can be increased by forming the light distribution correction element 6 only in the central portion of the convex lens 2b while the diffraction efficiency of the light distribution correction element 6 is constant. This provides a significant advantage in that the optical head device can be assembled easily.

It is useful that a concentric diffraction grating is used as the diffraction grating so that the light distribution correction element 6 is provided with a lens effect. In this case, the diffracted light is defocused when transmitted light is converged on the optical disk 3, so that the light is not reflected with unwanted information. Therefore, it is not necessary to reduce the grating pitch to increase the diffraction angle as in the second conventional example, which facilitates the production of the light distribution correction element 6.

Furthermore, light distribution can be corrected also by using a light distribution correction element constituted by a filter in which a vapor deposited film made of a metal such as chromium (Cr) or silver (Ag) is formed only in the central portion. It is preferable that the size of the area in which the metal vapor deposited film is formed, that is, the diameter of the metal vapor deposited film, is ½ or more and ¾ or less of the convex lens 2b. In this case, it is not necessary to form a grating having a small pitch as in the second conventional example, so that the light distribution correction element 6 can be produced easily.

It is preferable that the transmittance of the central portion (portion in which the metal vapor deposited film is formed and the transmittance is reduced by a certain degree) of the light distribution correction element 6 is about 65% to 85%, when the chromatic aberration correction element 7 is not used together with the light distribution correction element 6. These values can provide an effect of increasing the light utilization efficiency as a whole, in which the effect obtained from increasing the capturing NA by the collimator lens 9 can offset the light amount loss caused by not using the light amount in the central portion.

It is preferable that the transmittance of the central portion (portion in which the metal vapor deposited film is formed and the transmittance is reduced by a certain degree) of the light distribution correction element 6 is about 60% to 75%, when the chromatic aberration correction element 7 is used together with the light distribution correction element 6. These values can provide an effect of correcting a reduction of the transmittance in the outer portion due to the chromatic aberration correction element by further about 10% from the case where the chromatic aberration correction element 7 is not used together with the light distribution correction element 6.

By forming the light distribution correction element 6 in this manner, the light distribution correction element 6 and the chromatic aberration correction element 7 can be formed integrally, which makes it possible to align the centers of the chromatic aberration correction element 7 and light distribution correction element 6 within a tolerance of 5 μm, and to perform profile correction more accurately in view of compensation of the light amount loss in the outer portion due to the chromatic aberration correction element 7. If the light distribution is corrected by this light distribution correction element 6, the utilization efficiency of the laser beam emitted from the semiconductor laser light source 10 can be improved significantly from a conventional method of reducing the capturing NA of the collimator lens 9 to level the light amount distribution.

Furthermore, in the optical head device of this embodiment, a polarization beam splitter 13 is provided as optical path splitting means for splitting an optical path (outgoing optical path) from the semiconductor laser light source 10 to the optical disk 3 from an optical path (return optical path) at which light reflected at the optical disk 3 travels to a photo-detector 12. As the optical splitting means other than the polarization beam splitter 13, a half mirror, a diffraction element or the like can be used. In this case, the light distribution correction element 6 can be inserted between the semiconductor laser light source 10 and the optical path splitting means, so that the light distribution correction element 6 acts only in the outgoing optical path and does not act in the return optical path, and thus the light utilization efficiency in the return optical path can be increased and a signal to noise ratio (S/N) can be increased so that stable signal reproduction can be achieved. In FIG. 1, reference numeral 5 denotes light incident on the objective lens 1.

For example, simulations are performed to determine which approach of the approach of reducing the capturing NA of the collimator 9 to correct the light distribution and the approach of correcting the light distribution with the light distribution correction element 6 can improve the utilization efficiency of a laser beam emitted from the semiconductor laser light source 10. It is known by the recording/reproduction experiments of the optical system that when the light intensity in the outermost portion of the objective lens 1 is smaller than 60% of the light intensity in the central portion, the quality of recording/reproducing signals starts to deteriorate. For this reason, the simulations are performed under the condition in which it is ensured that the light intensity in the outermost portion of the objective lens 1 is at least 60% of the light intensity in the central portion.

First, when neither the chromatic aberration correction element 7 or the light distribution correction element 6 were present, the utilization efficiency of the laser beam emitted from the semiconductor laser light source 10 was 40% under the following conditions: the effective diameter of the objective lens 1 was 3.4 mm; the diverging angle of the laser beam was 27 degrees; the capturing NA of the collimator lens 9 was 0.2; and the light intensity in the outermost portion of the objective lens 1 was 60% of the light intensity in the central portion. Next, when only the chromatic aberration correction element 7 was inserted under the above conditions, the utilization efficiency of the laser beam emitted from the semiconductor laser light source 10 was reduced to 37.8%, and the light intensity in the outermost portion of the objective lens 1 was reduced to 56% of the light intensity in the central portion. It is assumed that for the chromatic aberration correction element 7, the grating pitch at the largest effective diameter position is 6.5 μm, the diffraction efficiency is 91% at the largest effective diameter position, and the diffraction efficiency in the central portion is 98%.

In this manner, when only the chromatic aberration correction element 7 was inserted, the light intensity in the outermost portion of the objective lens 1 was smaller than 60% of the light intensity in the central portion. In order to correct it to be 60% or more, first, the capturing NA of the collimator lens 9 was reduced from 0.2 to 0.188. However, in this case, the utilization efficiency of the laser beam emitted from the semiconductor laser light source 10 was reduced further to 33.7%.

Next, the light distribution correction element 6 of this embodiment was inserted and the light intensity in the outermost portion of the objective lens 1 was set to 60% of the light intensity in the central portion. In this case, the utilization efficiency of the laser beam emitted from the semiconductor laser light source 10 was 36.2%.

The diffraction efficiency of the light distribution correction element 6 is set as follows. The diffraction efficiency of the light distribution correction element 6 in a position opposing the central portion of the chromatic aberration correction element 7 is 91.5%. The diffraction efficiency of the light distribution correction element 6 in a position opposing a position in which the grating pitch of the chromatic aberration correction element 7 is 15 μm is 91.3%. The diffraction efficiency of the light distribution correction element 6 in a position opposing a position in which the grating pitch of the chromatic aberration correction element 7 is 10 μm is 91.1%. The diffraction efficiency of the light distribution correction element 6 in a position opposing a position in which the grating pitch of the chromatic aberration correction element 7 is 6.5 μm is 100%.

Figure 2A:
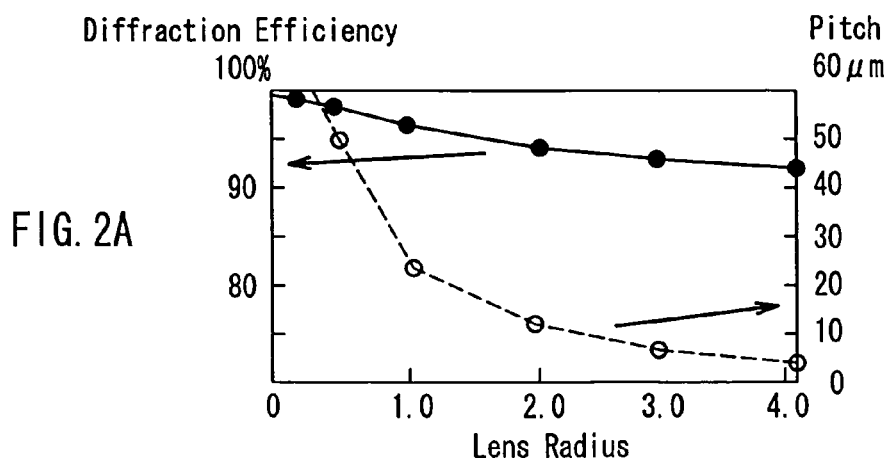
FIG. 2A is a graph showing the relationship between the distance from the center of the optical axis of a chromatic aberration correction element and the grating pitch and the diffraction efficiency.
Figure 2B:
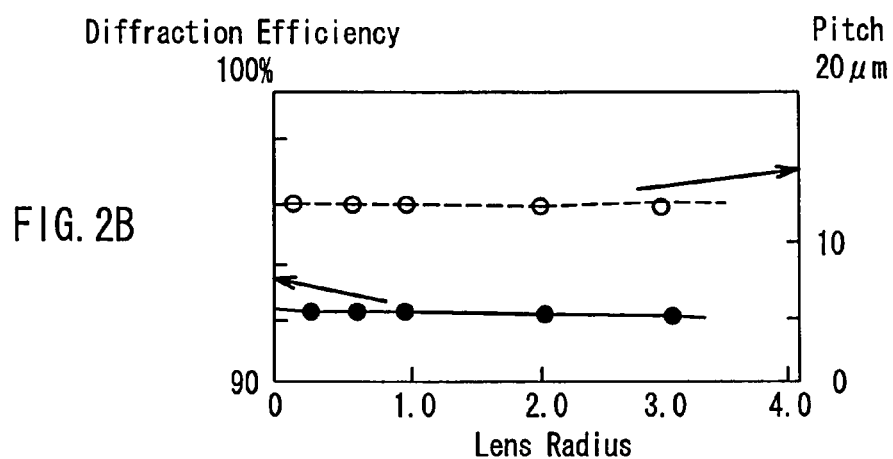
FIG. 2B is a graph showing the relationship between the distance from the center of the optical axis of a light distribution correction element and the grating pitch and the diffraction efficiency according to the first embodiment of the present invention.

FIG. 2A shows the relationship between the distance from the center of the optical axis of a chromatic aberration correction element and the diffraction efficiency and the grating pitch. FIG. 2B shows the relationship between the distance from the center of the optical axis of the light distribution correction element of this embodiment and the diffraction efficiency and the grating pitch.

The utilization efficiency of the laser beam emitted from the semiconductor laser light source 10 is 33.7% in the conventional approach (reducing the capturing NA of the collimator lens 9), whereas it is 36.2% in the approach of this embodiment, and if the light distribution correction element 6 is inserted, a 3% improvement (about a 10% improvement from 33.7% for the conventional approach) in the utilization efficiency is expected. This value appears to be small, but when the approach of this embodiment is applied to an actual recording/reproducing head device, the output light intensity of the semiconductor laser light source 10 to be required is changed significantly.

This will be described by taking the case where 12 mW is required as the output light intensity from the objective lens 1 for recording information on the optical disk as an example. The output of the semiconductor laser light source 10 that is required when the chromatic aberration correction element 7 is not present is 12/0.4=30 mW.

In this case, when correcting the light distribution non-uniformity occurring in the chromatic aberration correction element 7 by the light distribution correction element 6 of this embodiment, a semiconductor laser light source 10 with only 12/0.36=33 mW can be used. That is to say, the burden on the semiconductor laser light source 10 is increased only 10%.

However, when this light distribution non-uniformity is solved by the conventional approach of reducing the capturing NA of the collimator lens 9, the necessary output of the semiconductor laser light source 10 is 12/0.33=36 mW, and a 20% increase in the output is required. In other words, this embodiment provides remarkable advantages in that the light utilization efficiency is increased, the light intensity in the outer portion can be kept at the same level as the light intensity in the vicinity of the optical axis, and focusing performance to the optical disk 3 can be obtained by setting the numerical aperture from the semiconductor laser light source 10 to the focusing optical system.

When the output light intensity required for recording is 50 mW, if the arrangement of this embodiment is used, a semiconductor laser light source 10 having a laser output of 55 mW is sufficient. However, when the conventional approach of reducing the capturing NA is used, a semiconductor laser light source 10 having a laser output of 60 mW is required.

Thus, when recording information on the optical disk 3, in general, a high power semiconductor laser light source 10 is required, so that this improvement in transmittance efficiency is very significant.

In this embodiment, the beam expander 2 is provided, but a desired effect can be obtained without providing the beam expander 2, so that an arrangement in which the beam expander 2 is not provided can be used.

Figure 3:
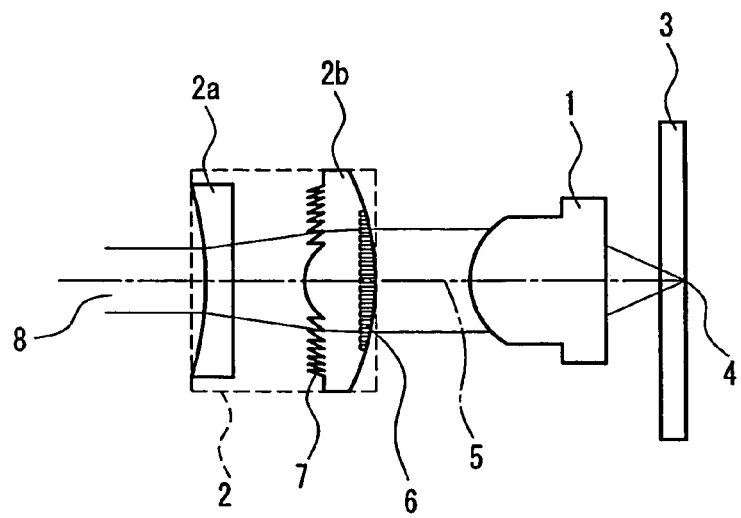
FIG. 3 is a schematic view showing an arrangement in the vicinity of an objective lens of another example of the optical head device according to the first embodiment of the present invention.

In this embodiment, the objective lens 1 is constituted by the convex lens 1a and the convex lens 1b (two lens structure), but the single lens structure shown in FIG. 3 functions using the same principle.

Second Embodiment

Figure 4:
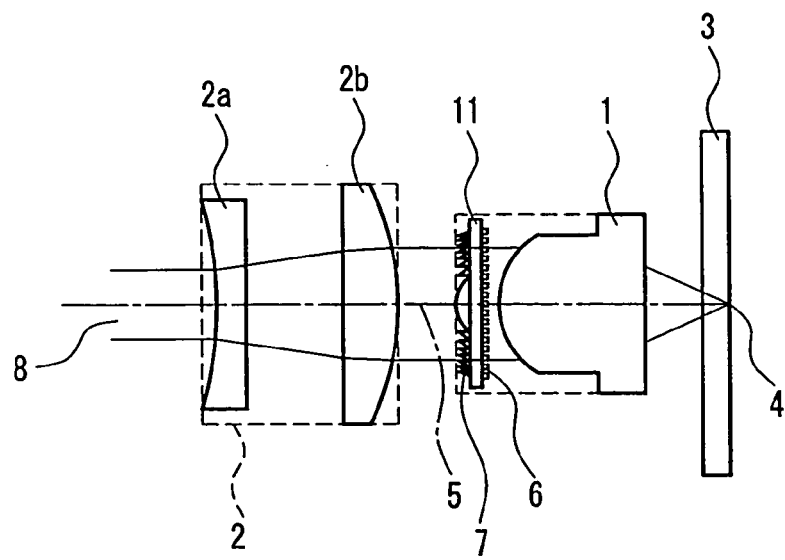
FIG. 4 is a schematic view showing an arrangement in the vicinity of an objective lens of an optical head device according to a second embodiment of the present invention.
Figure 5:
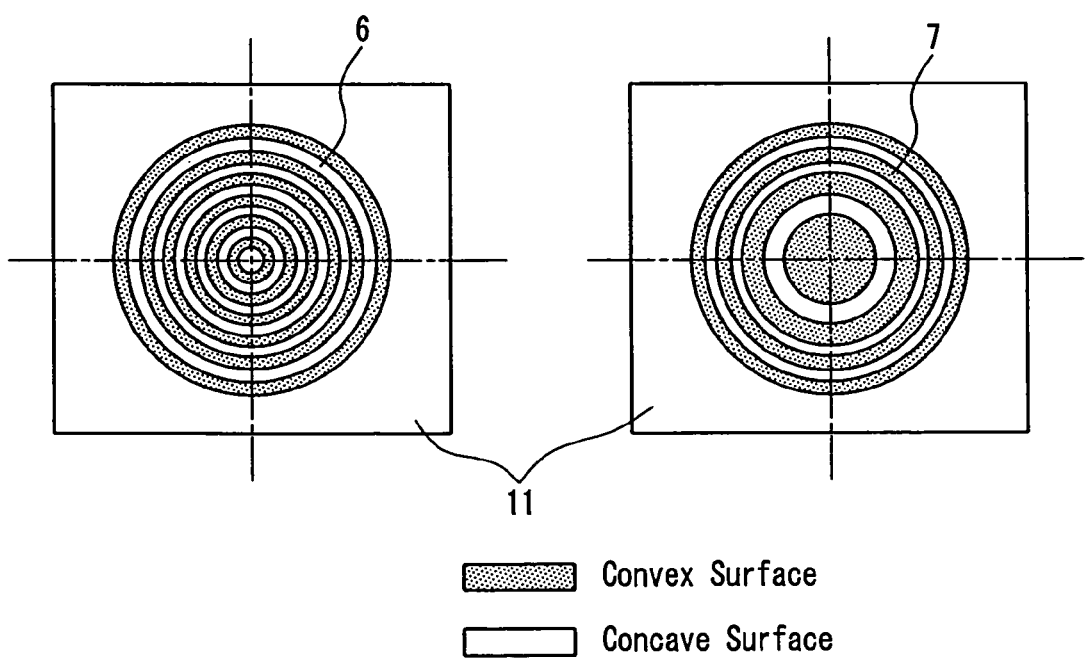
FIG. 5 is a plan view showing a light distribution correction element and a chromatic aberration correction element according to the second embodiment of the present invention.

FIG. 4 is a schematic view showing an arrangement in the vicinity of an objective lens of an optical head device according to a second embodiment of the present invention. FIG. 5 is a plan view showing the light distribution correction element and the chromatic aberration correction element.

As shown in FIGS. 4 and 5, in this embodiment, the light distribution correction element 6 and the chromatic aberration correction element 7 are formed simultaneously on respective surfaces of a formation plate 11 that is separated from the beam expander 2. The formation plate 11 is fixed integrally to the objective lens 1. Therefore, even if the objective lens 1 moves in the traverse direction along the information groove on the optical disk 3, the center of the objective lens 1 is not displaced from the center of the chromatic aberration correction element 7 or the center of light distribution correction element 6. Consequently, portions having a smaller pitch of the chromatic aberration correction element 7 than necessary do not have to be used, so that the production of the elements can be simplified. Furthermore, an increase of the grating pitch can improve the utilization efficiency.

The diffraction efficiency in the radius direction required for the light distribution correction element 6 is substantially constant as shown in FIG. 2B, so that it is not necessary to change the groove depth of the diffraction grating. However, when it is necessary to change the diffraction efficiency in the radius direction significantly, the groove depth of the diffraction grating may be changed. If a change in the groove depth of the diffraction grating causes a problem in the phase of transmitted light, the shape of the objective lens 1 or the shape of the lenses constituting the beam expander 2 can be changed in order to correct the phase.

Furthermore, the light distribution also can be corrected by changing the design of an anti-reflection coating (AR coating) formed in order to prevent reflection on the surface of the objective lens 1. In order to increase the NA of the objective lens 1, as shown in FIG. 1, it is necessary to increase the curvature of the surface (e.g., convex surface of the lens 1a on the left side of the drawing) of the objective lens 1 on the side of the semiconductor laser light source 10. For this reason, the incident angle of the beams in the vicinity of the optical axis is significantly different from that in the outermost portion. For example, when the NA of the objective lens 1 is 0.85, the incident angle of the beams in the vicinity of the optical axis is different from that in the outermost portion by about 40 degrees or more. The reflectance of the AR coating is changed depending on the incident angle of the beams. Therefore, if the AR coating is designed such that the reflectance is lowest and the transmittance is highest with respect to the incident angle of the beams into the outermost portion, reflection occurs in the inner circumference portion in the vicinity of the optical axis and the transmittance is reduced. Furthermore, when the NA from the semiconductor laser light source 10 to the collimator lens 9 is increased, the advantages of improving the light utilization efficiency and improving focusing performance, that is, improving the light recording density can be obtained without increasing the number of components or processes. An attempt to improve the design of the AR coating is disclosed in JP2001-6204A, but this publication does not disclose "the arrangement by which the light utilization efficiency is improved by further increasing the NA from the light source to the collimator lens" as disclosed in this specification.

Figure 6:
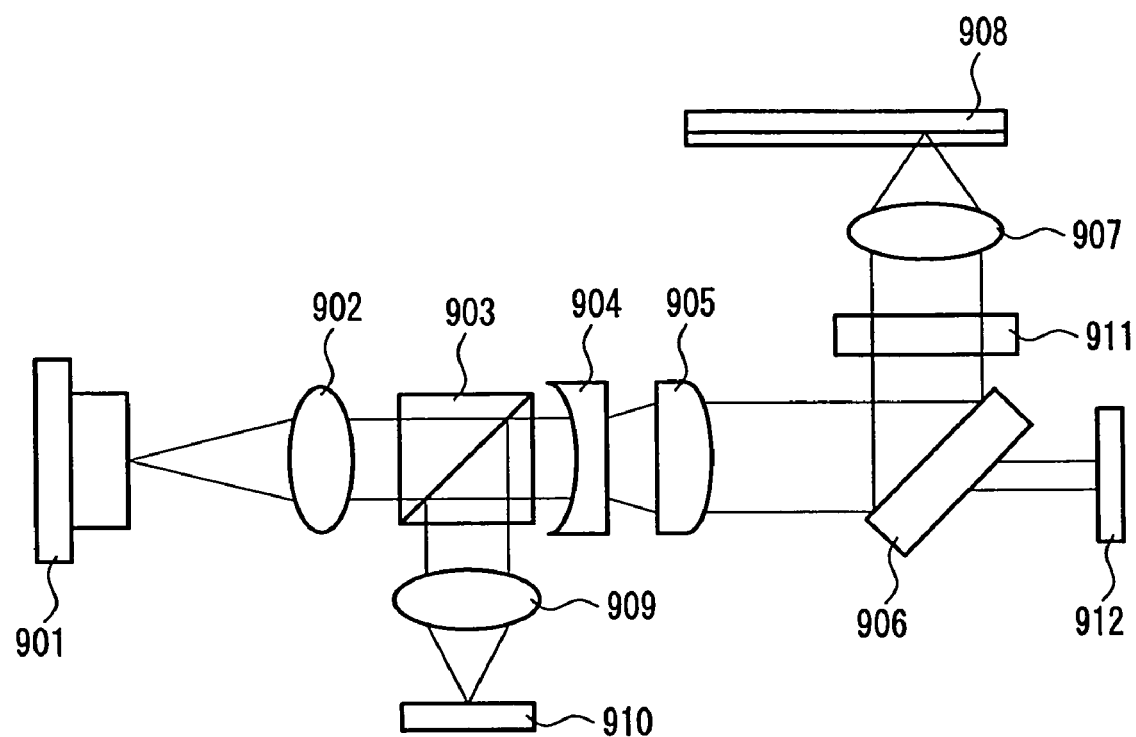
FIG. 6 is a schematic view showing the configuration of another example of an optical head device according to the second embodiment of the present invention.

Furthermore, the light distribution correction element can be realized by other methods than the above-described method. FIG. 6 shows a schematic configuration of an optical head device using a light distribution correction element other than the above example of the second embodiment of the present invention. As shown in FIG. 6, this optical head device includes a focusing optical system that focuses a laser beam emitted from a semiconductor laser light source 901 on an optical disk 908, using an objective lens 907. A beam expander including a concave lens 904 and a convex lens 905 that are disposed in this order from the side of the semiconductor laser light source 901 is provided between the semiconductor laser light source 901 and the objective lens 907.

A light distribution correction element 906 including a mirror formed with a dielectric multilayer film (e.g., a laminate including a plurality of layers obtained by laminating $SiO_2$ and titanium oxide alternately can be used) is disposed between the beam expander and the objective lens 907. The light distribution correction element (mirror) 906 has different reflectances depending on the polarization direction. For example, the reflectance of a predetermined portion (inner circumferential portion near the optical axis) is K1 with respect to P polarization and K2 with respect to S polarization. The reflectance of a portion other than the predetermined portion (peripheral portion of the predetermine portion) is K3 with respect to both P polarization and S polarization. In this embodiment, K1 is set to 70%, and K2 and K3 are set to 100%.

In this optical head device, a polarization beam splitter 903 is provided as optical path splitting means for splitting an optical path (outgoing optical path) from the semiconductor laser light source 901 to the optical disk 908 from an optical path (return optical path) at which light reflected at the optical disk 908 travels to a photo-detector 910. In FIG. 6, reference numeral. 902 denotes a collimator lens for converting divergent light (laser beam) emitted from the semiconductor laser light source 901 to the collimated light flux, reference numeral 909 denotes a focusing lens, and reference numeral 911 denotes a L/4 wavelength plate (L is an odd number of 1 or more). Reference numeral 912 denotes a photo-detector for receiving the light transmitted through the light distribution correction element 906 of the light on the outgoing optical path.

Hereinafter, the operation of the optical head device configured as above will be described with reference to FIG. 6. The linearly polarized light (the polarization direction is a direction corresponding to P polarization with respect to the light distribution correction element 906) emitted from the semiconductor laser light source 901 is converted to a collimated light flux by the collimator lens 902. The light transmitted through the collimator lens 902 is transmitted through the polarization beam splitter 903, and then is converted to divergent light by the concave lens 904. Then, the divergent light is converted to a collimated light flux by the convex lens 905 and reflected at the light distribution correction element 906, so that the direction to which the light is traveling is bent at an angle of 90 degrees. The light whose traveling direction is bent by the light distribution correction element 906 is converted to circularly polarized light by the L/4 wavelength plate 911, and then is focused on the optical disk 908 by the objective lens 907.

Then, the light reflected at the optical disk 908 is transmitted through the objective lens 907 and then is converted to light in a direction orthogonal to the polarization direction of the laser beam emitted from the semiconductor laser light source 901 by the L/4 wavelength plate 911. The light transmitted through the L/4 wavelength plate 911 is reflected at the light distribution correction element 906, transmitted through the convex lens 905 and the concave lens 904 sequentially in this order, and then reflected at the polarization beam splitter 903. Thus, the light is focused onto the photo-detector 910 by the focusing lens 909. Then, the photo-detector 910 outputs a focus error signal indicating the focusing state of the light on the optical disk 908, and outputs a tracking error signal indicating the irradiation position of the light. Herein, the focus error signal and the tracking error signal are detected by known techniques, e.g., an astigmatism method, a push-pull method, or the like. Focus control means (not shown) controls the position of the objective lens 907 to the optical axis direction thereof such that the light is constantly focused on the optical disk 908 in the focusing state, based on the focus error signal. Tracking control means (not shown) controls the position of the objective lens 907 such that the light is focused on a desired track on the optical disk 908, based on the tracking error signal. Furthermore, information recorded on the optical disk 908 also can be obtained from the photo-detector 910.

Since the light distribution correction element 906 has the reflectance characteristics as described above, the reflectance in the inner circumferential portion near the optical axis is reduced with respect to the outgoing optical path. As a result, it is possible to relatively raise the light intensity in the outermost portion of the objective lens 907. In addition, with respect to the return optical path, the reflectance of the light distribution correction element 906 is uniform regardless of the position, so that the light distribution correction element 906 is a regular mirror.

As described above, it is possible to correct light distribution by using a mirror formed with a dielectric multilayer film and having the above-described reflectance characteristics. Moreover, it is not necessary to reduce the grating pitch as in the second conventional example, which facilitates the production of the light distribution correction element. This light distribution correction element 906 is a reflection type light distribution correction element, which is different from the transmission type light distribution correction element as described above.

Since the light distribution correction element 906 is located near the objective lens 907, if the center of the light intensity distribution is adjusted to match the center of the objective lens 907, a displacement between the center of the predetermined portion (inner circumferential portion near the optical axis) and the center of the light intensity distribution becomes small. As a result, it is possible to assemble an optical head device without adjusting the position of the light distribution correction element 906. Furthermore, the light transmitted through the inner circumferential portion near the optical axis of light distribution correction element 906 of the light on the outgoing optical path is received by the photo-detector 912, so that the power of the laser beam emitted from the semiconductor laser light source 901 can be monitored. By using this configuration, it is possible to monitor the power of the laser beam emitted from the semiconductor laser light source 901 using light that is not used for recording or reproduction. Therefore, it is possible to realize an optical head device having a high light utilization efficiency.

Furthermore, in this configuration, the light distribution correction element 906 is disposed between the polarization beam splitter 903 for splitting the light and the optical disk 908, but since the light distribution correction element 906 has different reflectances depending on the polarization direction, the light amount loss does not occur in the return optical path.

It is preferable that the reflectance of the central portion of the light distribution correction element 906 is about 65% to 85%, as in the first embodiment, when the light distribution correction element 906 is not used together with the chromatic aberration correction element. These values can provide an effect of increasing the light utilization efficiency as a whole, in which the effect obtained from increasing the capturing NA by the collimator lens 902 can offset the light amount loss caused by not using the light amount in the central portion.

It is preferable that the reflectance of the central portion of the light distribution correction element 906 is about 60% to 75%, as in the first embodiment, when the light distribution correction element 906 is used together with the chromatic aberration correction element. These values can provide an effect of correcting a reduction of the transmittance in the outer portion due to the chromatic aberration correction element by further about 10% from the case where the chromatic aberration correction element is not used together with the light distribution correction element 906.

Figure 7A:
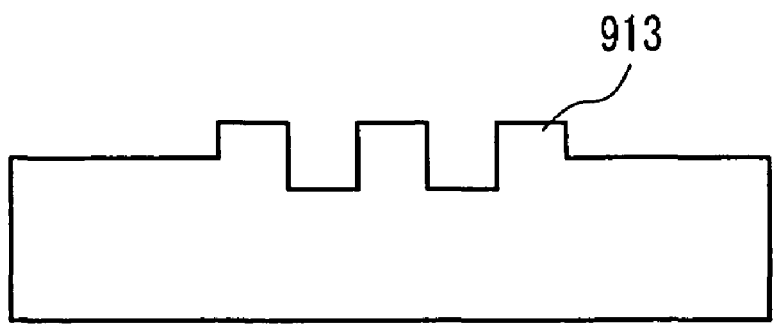
FIG. 7A is a schematic view showing the configuration of another example of a light distribution correction element according to the second embodiment of the present invention.
Figure 7B:
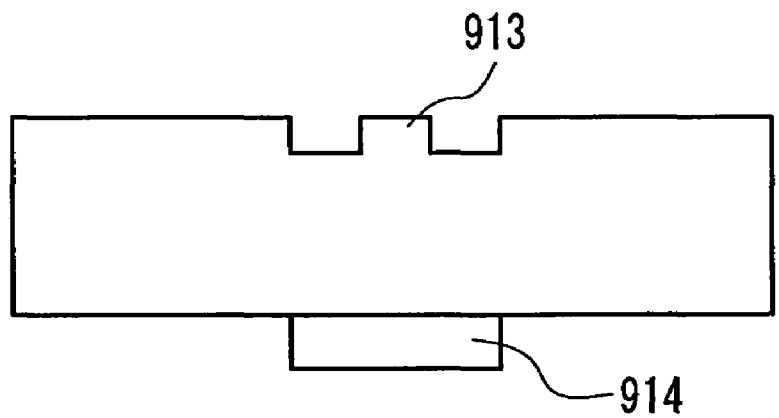
FIG. 7B is a schematic view showing the configuration of still another example of a light distribution correction element according to the second embodiment of the present invention.

As a light distribution correction element other than the above, an optical element in which a hologram is formed only in the central portion of a glass plate so that the transmittance of that portion is reduced can be used. If the phase of the light transmitted through the portion where the hologram is formed is different from that of the light transmitted through a portion other than the portion where the hologram is formed so that the characteristics of the optical head device are impaired, the phases can be adjusted to be matched with each other. The phases can be adjusted, for example, by reducing the thickness of the portion other than the portion in which the hologram 913 is formed, as shown in FIG. 7A. Another method for adjusting the phases is to provide a thin film 914 (e.g., a single $SiO_2$ layer can be used) on the back surface of the portion in which the hologram 913 is formed, as shown in FIG. 7B. Other methods can be used for the phase adjustment. Alternatively, the transmittance of that portion can be reduced by forming a dielectric multilayer film only on the central portion of the glass plate.

In the above, the case where the light transmitted through the inner circumferential portion near the optical axis of the light distribution correction element 906 is received by the photo-detector 912 so that the power of the laser beam emitted from the semiconductor laser light source 901 is monitored has been described. However, even if a light distribution correction element other than the light distribution correction element 906 is used, it is possible to monitor the power of the laser beam emitted from the semiconductor laser light source 901. For example, in the case of an element for correcting light distribution by forming a hologram and reducing the transmittance in that portion (2b of FIG. 1 and FIG. 7), it is possible to monitor the power of the laser beam emitted from semiconductor laser light source using diffracted light thereof. Furthermore, in the case of an element for correcting light distribution by forming a metal vapor deposited film and reducing the transmittance in that portion, it is possible to monitor the power of the laser beam emitted from semiconductor laser light source using reflected light thereof. An optical element (e.g., mirror) for changing the direction to which the light is traveling can be used in order to receive the diffracted light or the reflected light. There is no problem, if an optical element used in an optical system for recording or reproduction is used to change the light traveling direction. This is advantageous in the design of the optical head device, because the position of the photo-detector for receiving the diffracted light or the reflected light can be set arbitrarily.

Third Embodiment

Figure 8:
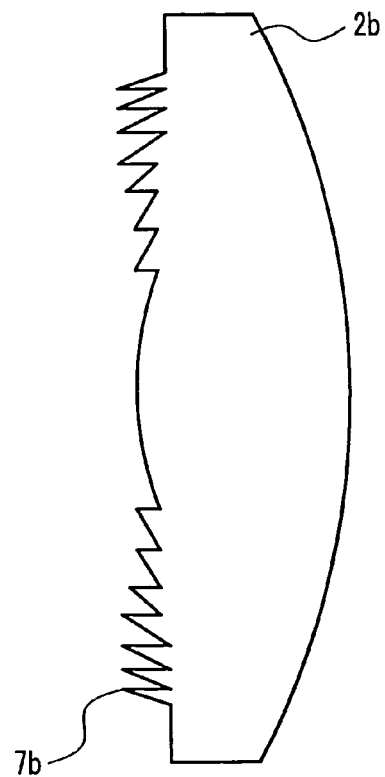
FIG. 8 is a cross-sectional view showing a lens in which a chromatic aberration correction element that also serves as a light distribution correction element is formed according to a third embodiment of the present invention.

The chromatic aberration correction element can serve also as the light distribution correction element. This will be described with reference to FIG. 8. FIG. 8 is a schematic cross-sectional view showing a convex lens constituting the beam expander. As shown in FIG. 8, a chromatic aberration correction element 7b constituted by a relief type blaze grating (indented blaze hologram) is formed integrally on the left surface of the convex lens 2b to correct chromatic aberration occurring in the objective lens. The height of the blaze grating in a portion corresponding to the vicinity of the center of the aperture surface of the objective lens is lower than the height in which the diffraction efficiency is largest, and thus the diffraction efficiency in the vicinity of the center of the chromatic aberration correction element 7b is low. Therefore, the light distribution can be corrected without providing a light distribution correction element separately, so that the diameter of an optical spot can be reduced and the light utilization efficiency can be improved. In addition, the number of components also can be reduced.

Figure 9:
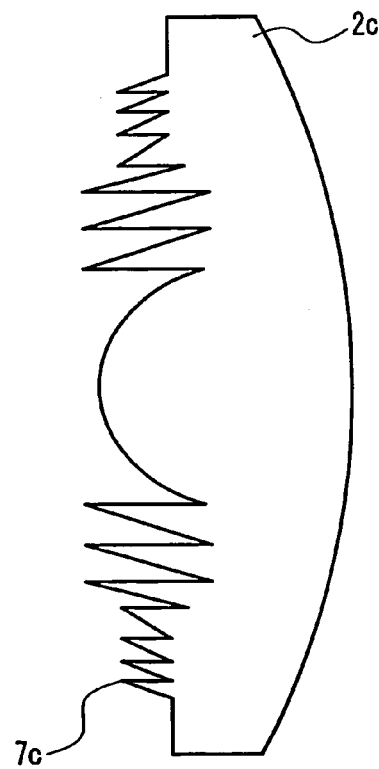
FIG. 9 is a cross-sectional view showing another example of the lens in which a chromatic aberration correction element that also serves as a light distribution correction element is formed according to the third embodiment of the present invention.

As shown in FIG. 9, the height of the blaze grating in a portion corresponding to the vicinity of the center of the aperture surface of the objective lens can be higher than the height in which the diffraction efficiency is largest so that the diffraction efficiency of the chromatic aberration correction element 7c is reduced.

Fourth Embodiment

Figure 10:
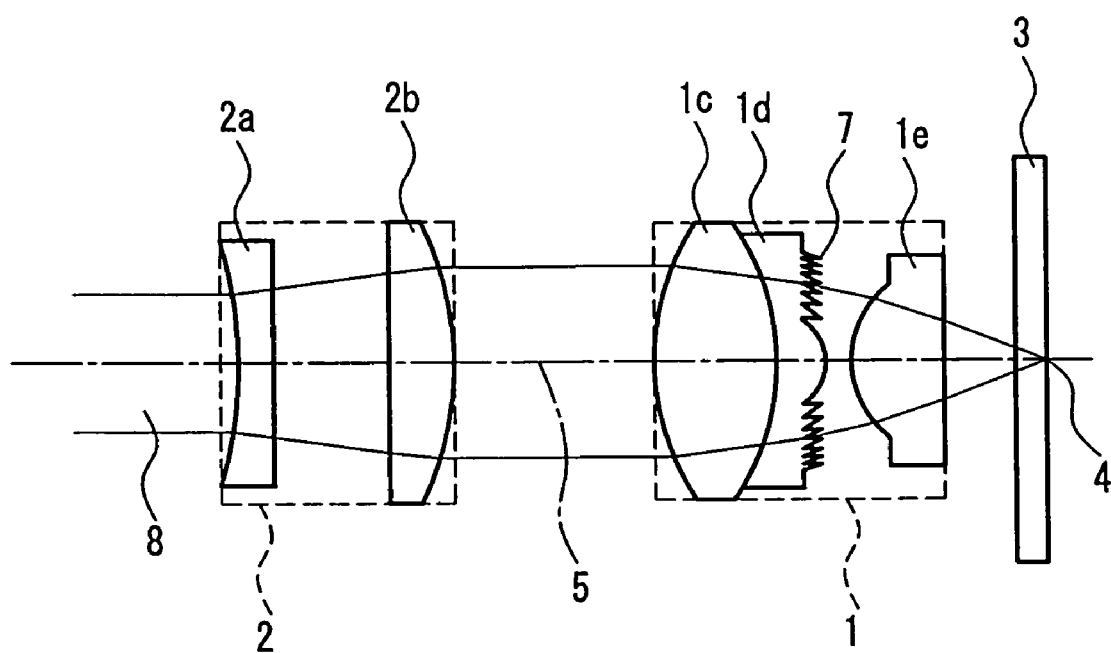
FIG. 10 is a schematic view showing an arrangement in the vicinity of an objective lens of an optical head device according to a fourth embodiment of the present invention.

When the objective lens 1 is a combination lens, as shown in FIG. 10, the light distribution correction element can be disposed between individual lenses (e.g., lenses 1d and 1e) constituting a combination lens. Furthermore, the chromatic aberration correction element 7 that also serves as the light distribution correction element can be formed on the surface of a lens (e.g., lens 1d in FIG. 10) so as to reduce the number of components.

Fifth Embodiment

Figure 11:
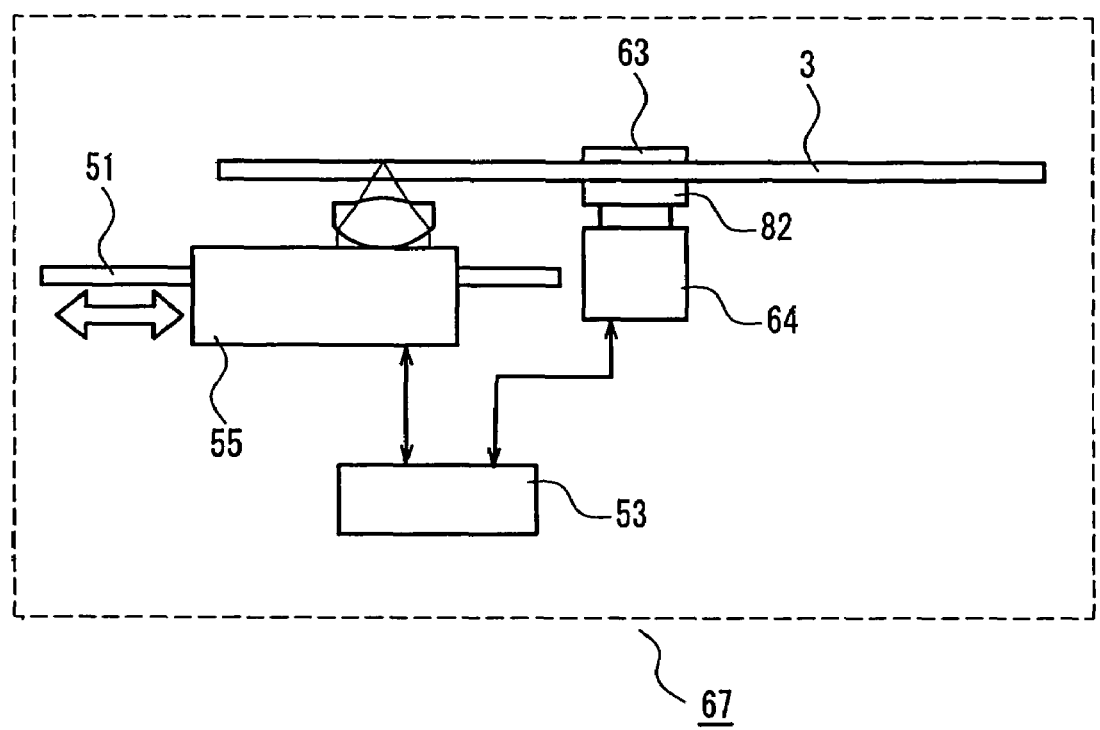
FIG. 11 is a schematic view showing an arrangement of an optical information apparatus according to a fifth embodiment of the present invention.

FIG. 11 is a schematic view showing an arrangement of an optical information apparatus according to a fifth embodiment of the present invention. As shown in FIG. 11, an optical disk 3 is mounted on a turntable 82, and driven to be rotated by a motor 64 serving as an optical information medium driving portion (when an optical card is used instead of the optical disk 3, the optical card is driven to be translated). Reference numeral 55 denotes an optical head device of the first to fourth embodiments, and the optical head device 55 is moved by a driving device 51 of the optical head device up to the approximate position of a track in which desired information is present on the optical disk 3.

The optical head device 55 supplies focus error signals and tracking error signals to an electrical circuit 53 serving as a control portion, corresponding to the positional relationship to the optical disk 3. Based on these signals, the electrical circuit 53 supplies a signal to move slightly the objective lens relative to the optical head device 55. Then, based on this signal, the optical head device 55 performs focus control and tracking control to the optical disk 3, and then reads out, writes (records) or erases information. Furthermore, the electrical circuit 53 also controls the motor 64 and a semiconductor laser light source in the optical head device 55, based on the signal obtained from the optical head device 55.

In the optical information apparatus 67 of this embodiment, an optical head device of the first to fourth embodiment is used as the optical head 55, so that a small focus spot can be formed on the optical disk 3, and recording/reproduction can be performed with respect to the optical disk having a high recording density.

Sixth Embodiment

Figure 12:
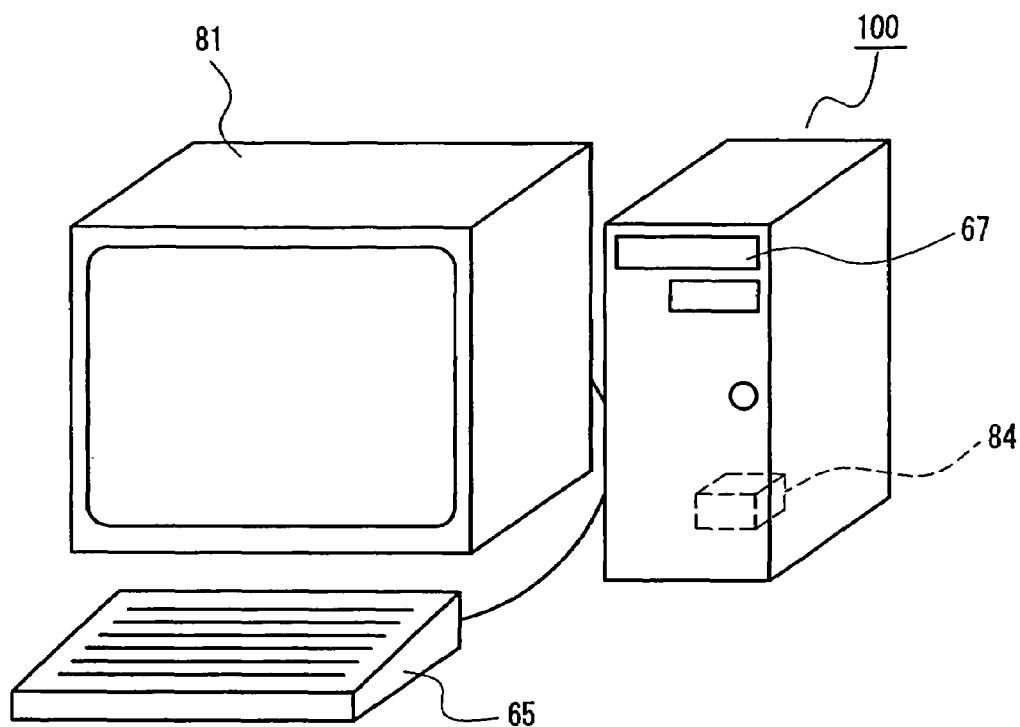
FIG. 12 is a schematic perspective view showing a computer according to a sixth embodiment of the present invention.

FIG. 12 is a schematic perspective view showing a computer according to a sixth embodiment of the present invention.

As shown in FIG. 12, a computer 100 of this embodiment includes the optical information apparatus 67 of the fifth embodiment, an input apparatus 65 from which information is input, such as a keyboard, a mouse or a touch panel, a processing apparatus 84 for processing based on the information input from the input apparatus 65 and the information read out by the optical information apparatus 67, such as a central processing unit (CPU), and an output apparatus 81 for displaying or outputting information such as results of processing of the processing apparatus 84, such as a cathode ray tube apparatus, a liquid crystal apparatus, or a printer.

Seventh Embodiment

Figure 13:
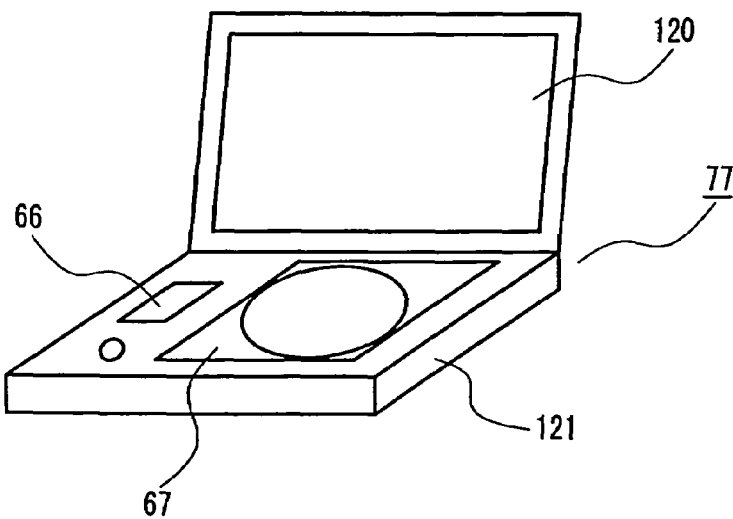
FIG. 13 is a schematic perspective view showing an optical disk player according to a seventh embodiment of the present invention.

FIG. 13 is a schematic perspective view showing an optical disk player according to seventh embodiment of the present invention.

As shown in FIG. 13, an optical disk player 121 of this embodiment includes the optical information apparatus 67 of the fifth embodiment, and a converting apparatus (i.e., decoder 66) from information to images for converting the information signal obtained from the optical information apparatus 67 to images.

This embodiment can be utilized as a car navigation system. It is also possible to create a configuration in which a display apparatus 120 such as a liquid crystal monitor is added.

Eighth Embodiment

Figure 14:
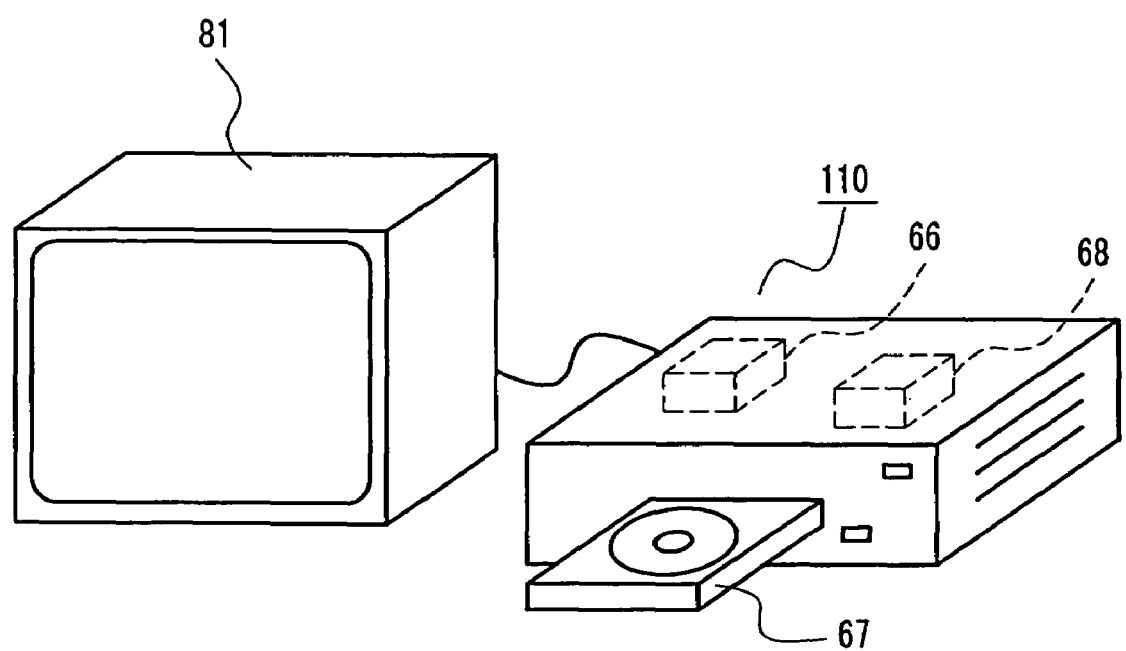
FIG. 14 is a schematic perspective view showing an optical disk recorder according to an eighth embodiment of the present invention.

FIG. 14 is a schematic perspective view showing an optical disk recorder according to an eighth embodiment of the present invention.

As shown in FIG. 14, an optical disk recorder 110 of this embodiment includes the optical information apparatus 67 of the fifth embodiment, and a converting apparatus (i.e., encoder 68) from images to information for converting image information to the information to be recorded on the optical disk by the optical information apparatus 67.

It is also possible to create a configuration in which a converting apparatus (i.e., decoder 66) from information to images for converting the information signal obtained from the optical information apparatus 67 to images is added. This configuration makes it possible to reproduce the already recorded portion.

It is also possible to create a configuration in which an output apparatus 81 for displaying information, such as a cathode ray tube apparatus, a liquid crystal display, and a printer is added.

The computer, the optical disk player, or the optical disk recorder provided with the optical information apparatus 67 of the fifth embodiment or using the above-described recording/reproducing method can record or reproduce information on an optical disk having a higher recording density, so that more information can be stored and processed.

Ninth Embodiment

Figure 15:
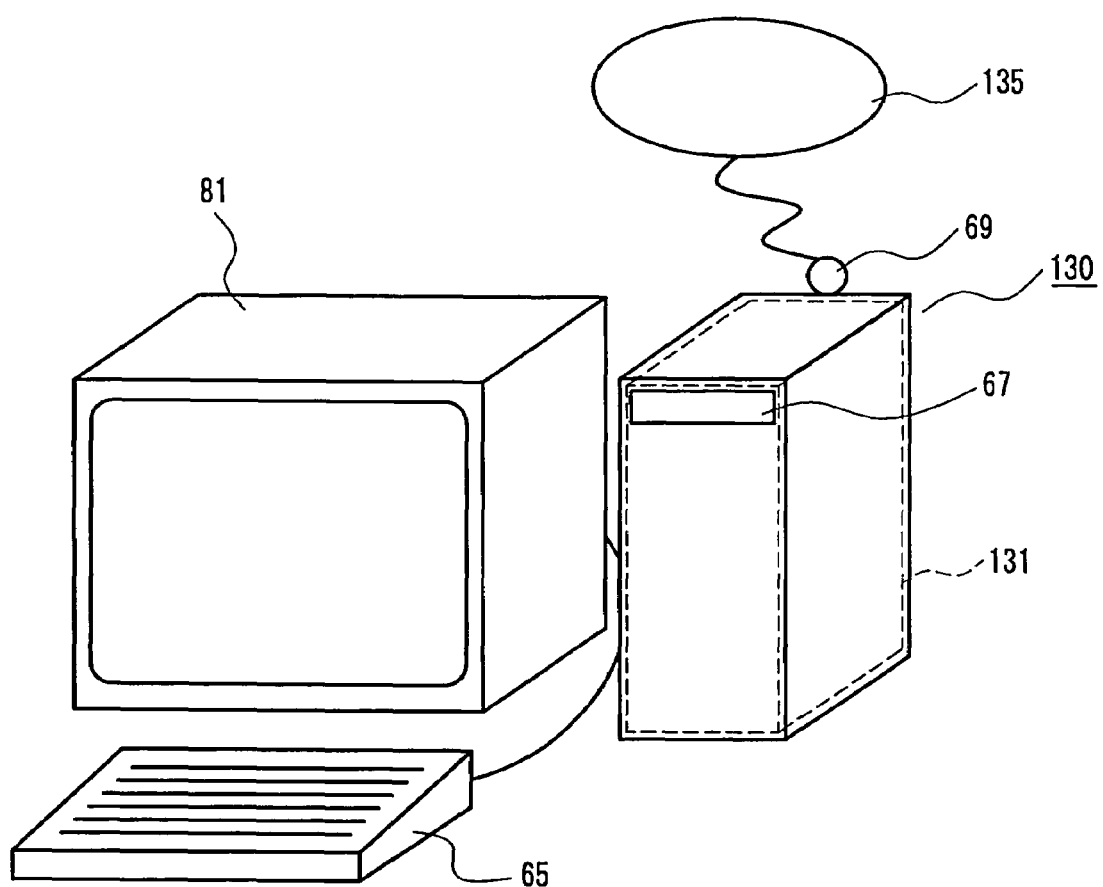
FIG. 15 is a schematic perspective view showing an optical disk server according to a ninth embodiment of the present invention.

FIG. 15 is a schematic perspective view showing an optical disk server according to a ninth embodiment of the present invention.

As shown in FIG. 15, an optical disk server 130 of this embodiment includes the optical information apparatus 67 of the fifth embodiment, and a wired or wireless input/output terminal 69 for capturing information to be recorded in the optical information apparatus 67 or outputting information read out by the optical information apparatus 67.

This configuration makes it possible for the optical disk server 130 to exchange information with a network 135, that is, a plurality of appliances such as computers, telephones, and television tuners, and can be utilized as a common information server for these appliances. Since recording/reproduction can be performed stably on different types of optical disks, it can be used in a wide range of applications.

It is also possible to create a configuration in which an output apparatus 81 for displaying information, such as a cathode ray tube apparatus, a liquid crystal display, and a printer is added.

Furthermore, if a changer 131 for inserting to and removing a plurality of optical disks from the optical information apparatus 67 is added, much information can be recorded and stored.

In the sixth to ninth embodiments, FIGS. 12 to 15 show the output apparatus 81 or the liquid crystal monitor 120, but it is possible that there are commercialized forms in which only an output terminal is provided and the apparatus 81 and the liquid crystal monitor 120 are not provided, but are available separately. An input apparatus is not shown in FIG. 13 or 14, but it is possible that there are commercialized forms in which an input apparatus such as a keyboard, a touch panel, a mouse, and a remote control apparatus is provided. On the other hand, in the sixth and ninth embodiments, it is possible that the input apparatus is available separately, and only an input terminal is provided.

Furthermore, also when an optical card is used as the optical information medium of the present invention, instead of the optical disk, the same advantages as when the optical disk is used can be obtained. In other words, the present invention can be applied to all the optical information media on which recording or reproduction can be performed by forming small focus spots.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical head device comprising an optical system for focusing a laser beam emitted from a semiconductor laser light source on an optical information medium with an objective lens,
   wherein a diffractive lens for correcting chromatic aberration occurring in the objective lens is provided between the semiconductor laser light source and the optical information medium,
   the diffractive lens is constituted by a blazed diffraction element, and
   a height of the blazed diffraction element in a portion corresponding to a vicinity of a center of an aperture surface of the objective lens of the diffractive lens is set to a height that is different from a height in which a diffraction efficiency is largest so as to correct a reduction of the intensity of the light incident on the aperture surface of the objective lens with a distance from a center of the aperture surface.

2. The optical head device according to claim 1, wherein the diffractive lens for correcting chromatic aberration and the objective lens are fixed integrally.

3. The optical head device according to claim 2, wherein the diffractive lens for correcting chromatic aberration is formed integrally on a surface of the objective lens.

4. An optical information apparatus comprising:
   the optical head device according to claim 1;
   a motor for rotating the optical information medium; and
   an electrical circuit for receiving a signal obtained from the optical head device and controlling and driving the motor, the objective lens and the semiconductor laser light source, based on the signal.

5. A computer comprising:
   the optical information apparatus according to claim 4;
   an input apparatus or an input terminal from which information is input;
   a processing apparatus for performing processing based on the information input from the input apparatus or the input terminal and information read out by the optical information apparatus, and
   an output apparatus or an output terminal for displaying or outputting the information input from the input apparatus or the input terminal, the information read out by the optical information apparatus and results of the processing by the processing apparatus.

6. An optical disk player comprising:
   the optical information apparatus according to claim 4; and
   a decoder from information to images for converting an information signal obtained from the optical information apparatus to images.

7. A car navigation system comprising the optical disk player according to claim 6.

8. An optical disk recorder comprising:
   the optical information apparatus according to claim 4; and
   an encoder from images to information for converting image information to information to be recorded onto the optical information medium by the optical information apparatus.

9. An optical disk server comprising:
the optical information apparatus according to claim 4; and
an input/output terminal for exchanging information with an external device.

10. An objective lens for focusing a laser beam emitted from a semiconductor laser light source on an optical information medium,
wherein a diffractive lens for correcting chromatic aberration occurring in the objective lens is formed on a surface of the objective lens,
the diffractive lens is constituted by a Blazed diffraction element, and
a height of the Blazed diffraction element in a portion corresponding to a vicinity of a center of an aperture surface of the objective lens is set to a height that is different from a height in which a diffraction efficiency is largest so as to correct a reduction of the intensity of the light incident on the aperture surface of the objective lens with a distance from a center of the aperture surface.

11. The objective lens according to claim 10, wherein a numerical aperture of the objective lens is 0.85.

12. The objective lens according to claim 10, wherein a wavelength of the semiconductor laser light source is about 405 nm.

13. The objective lens according to claim 10, wherein an incident angle of a laser beam in the vicinity of an optical axis is different from that in an outermost portion by about 40 degrees or more.

* * * * *